United States Patent [19]

Huber

[11] 4,348,603

[45] Sep. 7, 1982

[54] PRINTED-CIRCUIT BOARD AND TRIGGER-SWITCH ARRANGEMENT FOR A PORTABLE ELECTRIC TOOL

[75] Inventor: Siegfried Huber, Johannesberg, Fed. Rep. of Germany

[73] Assignee: Black & Decker Inc., Newark, Del.

[21] Appl. No.: 229,452

[22] Filed: Jan. 29, 1981

[51] Int. Cl.³ .......................... H02K 7/14; B23B 45/2

[52] U.S. Cl. .......................... 310/50; 310/68 A; 200/157; 173/48

[58] Field of Search .............. 310/50, 68 A, 229, 230, 310/241; 200/1 V, 157, 321, 322, 334, 330, 331

[56] References Cited

U.S. PATENT DOCUMENTS

| | | | |
|---|---|---|---|
| 2,764,705 | 9/1956 | Albertson et al. | 310/68 |
| 3,260,827 | 7/1966 | Frenzel | 200/157 |
| 3,924,147 | 12/1975 | Tarnow et al. | 310/68 |
| 4,038,573 | 7/1977 | Hillyer et al. | 310/71 |
| 4,097,704 | 6/1978 | Piber | 200/157 |
| 4,204,580 | 5/1980 | Nalley | 173/48 |

FOREIGN PATENT DOCUMENTS

| | | | |
|---|---|---|---|
| 2724520 | 12/1978 | Fed. Rep. of Germany | 310/50 |

*Primary Examiner*—J. D. Miller
*Assistant Examiner*—D. L. Rebsch
*Attorney, Agent, or Firm*—Walter Ottesen; Edward D. Murphy; Harold Weinstein

[57] ABSTRACT

A portable electric drill has a printed circuit board assembly mounted in a motor compartment and attached to a stator lamination stack. A motor reversing switch is mounted on the printed circuit board assembly and has an operating pin which cooperates with an actuating lever that is mechanically interrelated to a trigger switch for energizing the drill. The trigger switch remains inoperative until the actuating lever is positioned to allow the motor to be energized to drivingly rotate in either one or other rotational direction. The printed circuit board assembly also has mounted thereon brush holders, noise-suppression elements, brush terminals, and field coil terminals. A pivoted lever for operating the reversing switch pin may be disposed inside or outside the motor compartment.

28 Claims, 17 Drawing Figures

PRINTED-CIRCUIT BOARD AND TRIGGER-SWITCH ARRANGEMENT FOR A PORTABLE ELECTRIC TOOL

FIELD OF THE INVENTION

The present invention relates generally to portable electric tools and more particularly to such tools that are capable of drivingly rotating in either of two rotational directions, for example, drills, hammer drills, power screwdrivers, etc.

BACKGROUND OF THE INVENTION

With portable electric tools there is a need to simplify assembly to both reduce production costs and to reduce the risk of assembly errors. This has become more important as such tools have become more sophisticated in their functioning.

In the manufacture of electric motors for such tools, it is becoming increasingly common practice to wind the field coils mechanically on to the stator and to provide terminations on the latter for receiving the ends of the field coil windings and which facilitate electrical connection of the windings to the commutator brushes. The stator assembly can be formed by a stack of field laminations and a plurality of coils, and be adapted for automatic connection of the coils to terminal means mounted on the stack wherein the terminal means and mounting means lie entirely within an area defined by the outline of the field laminations. Such an arrangement is disclosed in U.S. Pat. No. 4,071,793 which is hereby incorporated by reference.

Improvements have been made in the manner of connecting the electric leads to the stator assembly. In one such arrangement a pair of blocks made from suitable insulating material such as a polysulphone are located in slots in the stator laminated stack, these blocks being provided with a pair of apertures for receiving a conductive terminal. Each terminal comprises a sleeve portion for engaging in the aperture and a channel portion connected to the sleeve portion by a short connecting neck. A wire to be attached is crimped in the channel portion. Such an arrangement is disclosed in British Pat. No. 1,402,591 which is hereby incorporated by reference. When this method of connecting electrical leads is used with the stator assembly referred to above, the stator assembly can be readily manufactured as a separate unit which is then easily insertable into the housing of the portable electric tool and then the electrical connections to be made to it can be made simply and effectively.

It has been proposed to mount a printed circuit board on a plate having attached thereto carbon brush assemblies, with the plate being attached to the housing of the tool. The armature of the electric motor passes through central openings in both the plate and the printed circuit board.

In order to reverse the rotational direction of drive of an electric tool, a separate reversing switch can be incorporated. However, with many forms of motors, for example, universal motors, damage can occur if the reversing switch is operated to reverse the direction of electrical supply to the motor whilst it is still rotating. To eliminate this danger of damage occurring to the electrical motor, it has been proposed to incorporate the reversing switch in a trigger switch for energizing the tool. The trigger switch is mounted, as well known, in the handle of the tool, and the actuating member of the reversing switch is disposed immediately above the trigger of the trigger switch and just below the motor compartment of the tool. The actuating member of the reversing switch and the trigger are mechanically related so that the trigger remains inoperative, i.e. it cannot be moved, until the actuating member of the reversing switch is positioned to one side of the trigger to allow the motor to be energized to rotate in one direction, or until the actuating member is positioned to the other side of the trigger to reverse the direction of rotation of the motor.

A disadvantage of this reversing switch and trigger switch combination is that it complicates the number of electrical wires that have to feed from the handle of the tool through to the motor compartment and also the number of electrical connections that have to be made to the combined switches in the handle.

The present invention is concerned with further simplifying the assembly of portable electric tools.

It is an object of this invention to provide a portable electric tool having a reversing switch interrelated with a main energizing switch and being arranged so that the number of electrical wires feeding from the handle to the motor compartment can be reduced by at least two.

It is another object of this invention to provide a portable electric tool having a printed circuit board assembly in the motor compartment with the reversing switch being part of that assembly.

It is yet a further object of this invention to provide a portable electric tool having a comprehensive printed circuit board assembly in the motor compartment and being readily mounted on a stator lamination stack of the electric motor.

SUMMARY OF THE INVENTION

Towards the accomplishment of the aforementioned objects and others which will become apparent from the following description and accompanying drawings, there is disclosed a portable electric tool having an electric motor capable of drivingly rotating in either of two rotational directions. A housing of the tool has a handle and a motor compartment, the motor being contained in the motor compartment. A first switch for energizing the tool is mounted in the handle. A plurality of electrical wires feed from the first switch to the motor compartment for activating the functioning of the tool. A second switch is situated in the motor compartment for determining the rotational direction of drive of the motor. The first and second switches are interrelated whereby the first switch remains inoperative until the second switch is positioned to allow the motor to be energized to drivingly rotate in either one or other of said rotational directions. The situation of the reversing switch in said motor compartment enables the plurality of electrical wires to be at least two less than would otherwise be required.

A printed circuit board assembly is disposed in the motor compartment and has the second switch mounted thereon. This assembly has a central aperture therein which encircles a part of the armature of the motor, the assembly being mounted on the stator of the motor.

The printed circuit board assembly may also include brush holders with brushes and springs for resiliently urging the brushes into engagement with the commutator of the armature. It may also include plug-in terminals for engaging in the stator. Also, it may include noise-suppression components for preventing or hindering noise generated by arcing between the brushes and the commutator from being propagated over the supply lines.

The first switch may be actuated by a trigger movable in a first direction inwardly and outwardly of the handle. The reversing switch may have an actuating member which extends therefrom and which is operatively connected to a pivoted member. The pivoted member is movable transversely to said first direction for determining the rotational direction of the motor. The trigger can have a partition having an edge facing towards the first switch and defining two grooves in the trigger, and the pivoted member may have a detent which slidingly engages either of said grooves when the pivoted member is moved transversely to determine the direction of rotation of the motor, the detent engaging said edge to render the trigger inoperative when the pivoted member is in a central position. The reversing switch actuating member can be elongated and disposed at right angles to the rotational axis of the motor, and be movable in an arc about an axis at right angles to said rotational axis.

DETAILED DESCRIPTION OF THE PREFERRED EMBODIMENTS

Figure 1:
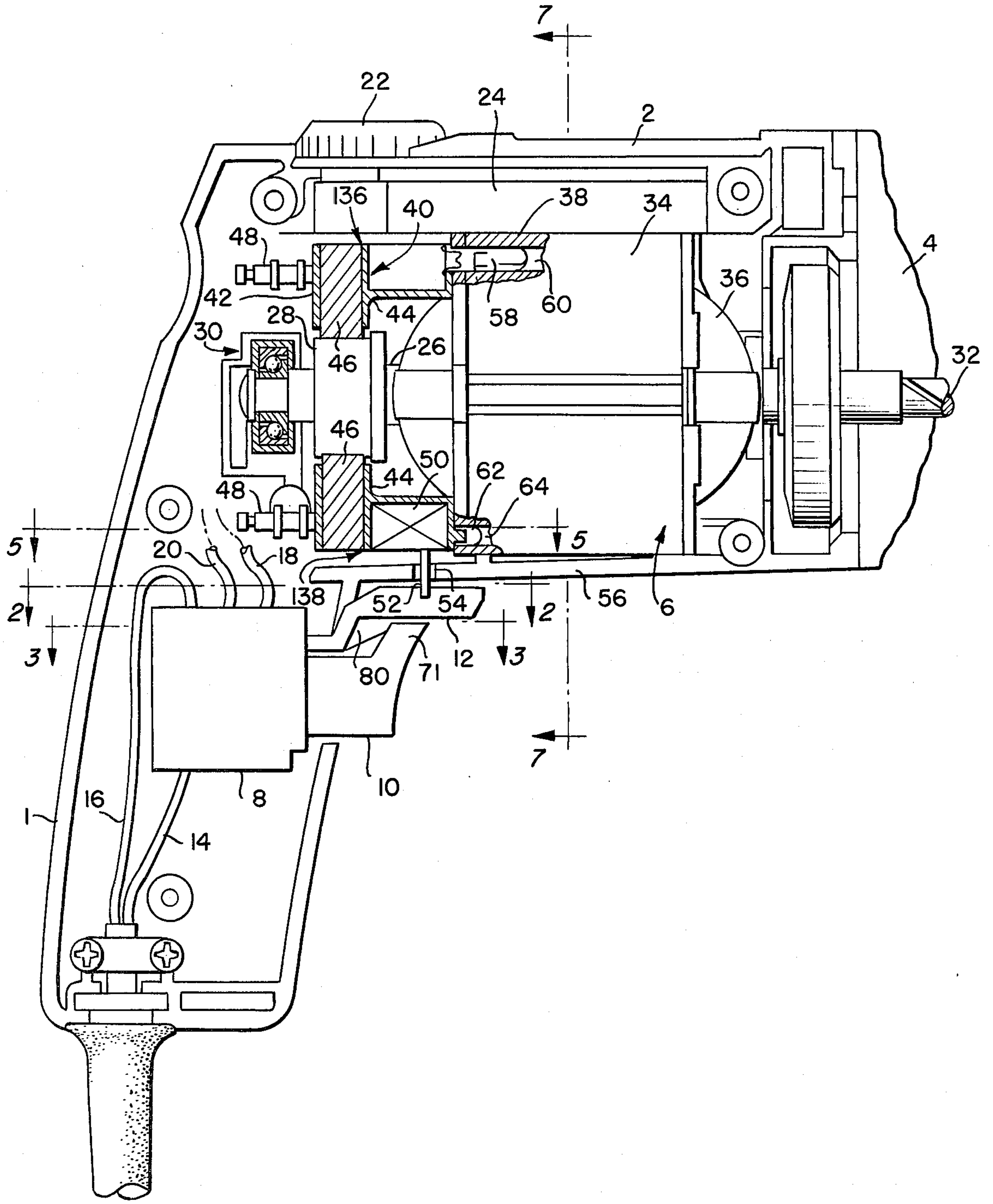
FIG. 1 is a diagrammatic vertical section of part of a hammer drill according to the present invention.

FIG. 1 discloses a hammer drill having a handle 1 and a motor compartment 2. The forward part of the drill, shown broken away at 4 would contain the percussion mechanism of the drill. A universal motor 6 is held in the motor compartment 2 in clam-shell fashion by two halves of the compartment 2. In the handle 1 is mounted a main switch 8 by which the tool is energized, the switch 8 being actuated by a trigger 10 in known manner. An actuating lever 12 extends between the upper portion of the trigger 10 and the lower portion of the motor compartment 2 and is pivotally attached to the body of the main switch 8. Electric leads 14,16 supply the main switch 8 with line voltage when the drill is connected to the source of line voltage. Electric leads 18,20 connect the main switch 8 to the motor compartment 2. It will be noticed that only a portion of leads 18 and 20 have been shown for siimplicity. Also, for simplicity and ease of understanding the inventive concept in the drill, components and parts not essential to the invention have been omitted in several places and other components and parts are illustrated diagrammatically. On the top of the compartment 2 is mounted a speed control dial 22 which operates through speed control circuitry in a compartment 24 for controlling the speed of the drill. The motor 6 has an armature 26 with a commutator 28, one end of the armature being journaled in a bearing 30 and the other end of the armature 26 being drivingly connected to a drive shaft 32. The universal motor 6 has a stator assembly 34 and two sets of field windings, only one of which 36 can be seen in FIG. 1. The stator assembly has a stator lamination stack 38 defining two poles upon which the respective field windings are wound.

A printed circuit board assembly 40 is mounted in the motor compartment 2 and comprises a printed circuit board 42 having mounted thereon brass brush holders 44 containing carbon brushes 46 which are urged by springs in contact with the commutator 28. A pair of plug terminals 48 extend from the rear of the printed circuit board for connecting to the brushes 46. A reversing switch 50, for reversing the direction of drive of the motor 6, is mounted on the circuit board 42 by means of a housing-like structure 138, and is disposed between the board 42 and the stator assembly 34. A pin 52, by which the switch 50 is actuated, extends downwardly through a slot 54 in the lower wall of the compartment 2 and engages in the actuating lever 12. A banana-type plug 58, supported from a housing-like structure, extends into a passageway 60 in the upper portion of the stator lamination stack 38. A securing pin 62 extends from the reversing switch 50 and engages in another passageway 64 in the lower portion of the stator lamination stack. The banana-type plug 58 and the securing pin 62 are close sliding fits in their respective passageways 60, 64 and comprise the main mounting of the printed circuit board assembly 40 on the stator assembly 34. As will be appreciated by those skilled in the art, the reversing switch 50 constitutes a discrete integral component, one which is readily available on the commercial market at an economical cost. It is conveniently mounted directly on the printed circuit board 42 and is mechanically coupled directly to the manually-manipulatable reversing member 12 so as to reduce the required wiring into the handle and simplify the overall assembly.

Figure 2:
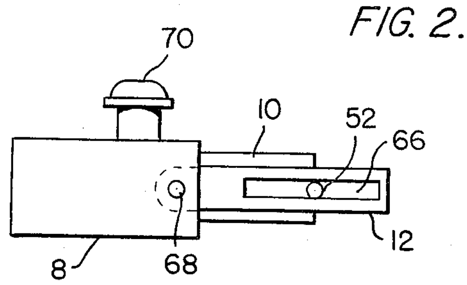
FIG. 2 is a diagrammatic view on the line 2—2 in FIG. 1 of a component.

FIG. 2 is a view looking downwards on the switch 8, trigger 10, and actuating lever 12. A slot 66 is disposed along the upper portion of the actuating lever 12 and the lower end of the pin 52 slidably engages in the slot 66. The left hand end of the actuating lever 12 is attached by a pivot pin 68 to the underside of the upper wall of the switch 8. A locking button 70 protrudes from the side of the switch 8 and functions in known manner to releasably hold the trigger 10 in its operating position when the button 70 is depressed.

Figure 3:
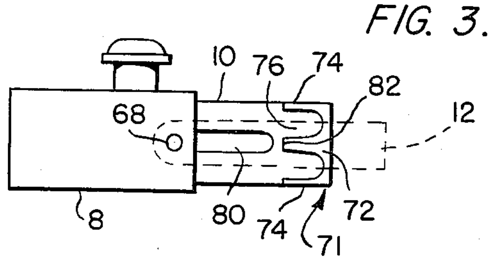
FIG. 3 is a diagrammatic view on the line 3—3 in FIG. 1 of the component.

FIG. 3 is a diagrammatic view looking down on the switch 8 and trigger 10 just below the actuating lever 12 which is shown in broken lines. The trigger 10 is formed at its outer-raised end 71 [see FIG. 1] with a short central partition 72 and two outer thin flanges 74, which together form two open ended grooves 76,78. A web-like detent 80 is formed on the lower side of the actuating lever 12 [see FIG. 1]. The partition 72 has an inner endface 82 which in the neutral central position of the actuating lever 12, as shown in FIG. 3, is disposed in line with and opposite detent 80. In this position the detent 80 prevents the trigger 10 from being squeezed inwards of the handle 1 to actuate the switch 8, i.e. in this position, the switch 8 is in the "off" position and the drill cannot be energized.

Figure 4:
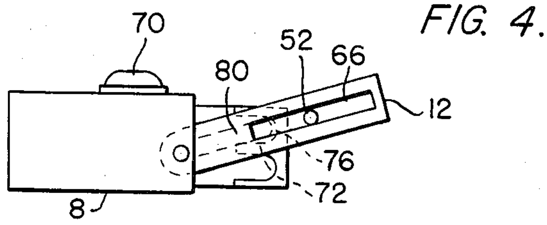
FIG. 4 is a similar view to FIG. 2 with the component in a different operating position.

FIG. 4 is a similar view to FIG. 2 but with the detent 80 and partition 72 shown in broken lines, and also with the actuating lever 12 pivoted sideways. As can be seen, the trigger 10 has now been moved inwardly into an operative position to energize the drill and the detent 80 has slid into the groove 76, at the same time the pin 52 of the reversing switch 50 has been moved by the slot 66 to operate the switch 50 to allow the motor 6 to be energized to drivingly rotate in one direction. When the actuating lever 12 is in the central position shown in FIGS. 2 and 3, the switch 50 remains in a neutral position in which the motor 6 cannot be energized. It should be noted that although the trigger 10 cannot be operated to actuate the switch 8 until the lever 12 has been pivoted to one side, thereafter the inward movement of the trigger 10 to actuate the switch 8 causes the endface 82 of the partition 72 to engage a side of the detent 80 and cause the lever 12 to be pivoted a sufficient amount to ensure full operation of the switch 50. To reverse the direction of drive of the motor 6 from the direction determined by the position of the lever 12 in FIG. 4, the trigger 10 is released to de-energize the drill and then the lever 12 is pivoted back through its central position to the opposite side of the trigger 10. Then, when the trigger 10 is again actuated, the detent 80 will slidably engage in the other groove 78.

Figure 5:
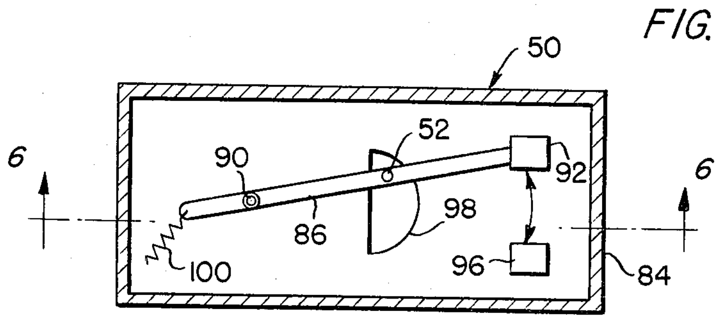
FIG. 5 is a diagrammatic section on the line 5—5 of FIG. 1 of another component.
Figure 6:
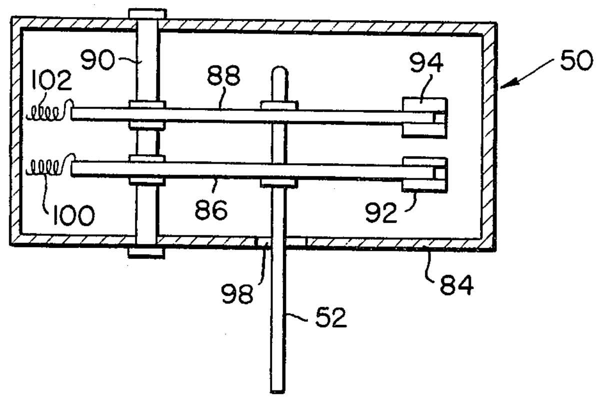
FIG. 6 is a section on the line 6—6 of FIG. 5.

Referring to FIGS. 5 and 6 the switch 50 has a housing 84 of insulating material and in which is pivotally mounted two parallel spaced apart contact arms 86,88. The arms 86,88 are pivotally supported by a pivot pin 90 of insulating material secured to the housing 84. The housing 84 contains four U-shaped spring contacts which are engagable by the outer ends of the contact arms 86,88. FIG. 5 shows the lower contact arm 86 engaged in one of the contacts 92. When the arm 86 is pivoted to the other side of the switch 50 its end disengages from the contact 92 and engages another one of the contacts 96. The bottom of the switch 50 has a semi-circular aperture 98 through which the pin 52, which is secured to both the contact arms 86,88, passes downwardly. The pin 52 is made from insulating material. As can be seen in FIG. 6, the upper contact arm 88 engages at its outer end in another of the contacts 94. Electric leads 100,102 are connected to the opposite ends of the arms 86,88. It will be appreciated that the switch 50 is a double pole switch actuated by the movement of the pin 52. As can be realized from FIG. 5, when the pin 52 is in a central position, as shown in FIG. 2, the contact arms 86,88 will be disengaged from either pair of U-shaped contacts, 92,94 being one such pair, so placing the switch in an off position.

Figure 7:
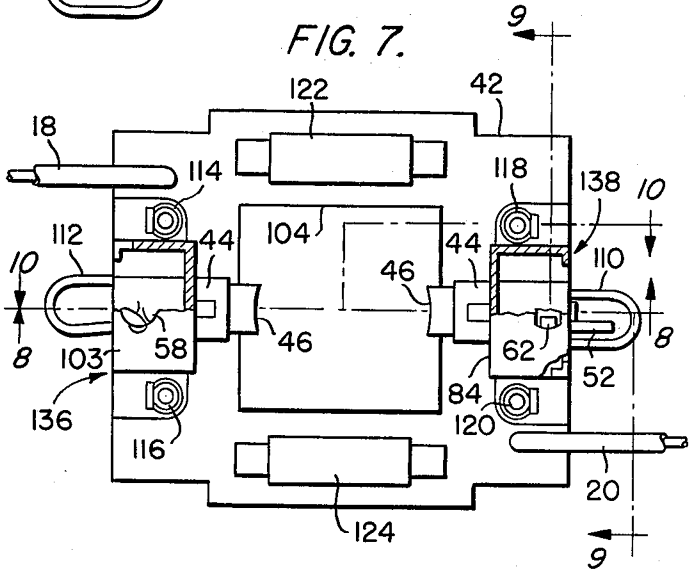
FIG. 7 is a view on the line 7—7 of FIG. 1 of a printed circuit board module according to the invention.

FIG. 7 is a view of the printed circuit board assembly 40 in the direction 7—7 of FIG. 1. However, it should be noted that the assembly 40 has been rotated through an angle of 90° anti-clockwise from the position in FIG. 1. Thus it will be seen that the pin 52 is on the right hand side in FIG. 7 instead of being at the bottom. The assembly is mounted on the printed circuit board 42 which has a central rectangular cutout 104 forming an aperture through which the commutator 28 is located [see FIG. 1]. Leads 18,20 from the main switch 8 supply the printed circuit which is on the underside of the printed circuit board 42. In FIG. 7 the upper half of a support compartment 103 for the banana-type plug 58, and the upper half of the switch housing 84 are diagrammatically shown in section, so that only half of an end view of the banana plug 58 and of the securing pin 62 is shown. The two carbon brushes 46 protrude inwardly of the aperture 104 and are connected to brush leads 110,112. Four field coil plug terminals 114,116,118,120, are mounted on the board 42. The assembly 40 includes components of noise suppression circuitry of which is shown two noise suppression coils 122 and 124.

Figure 8:
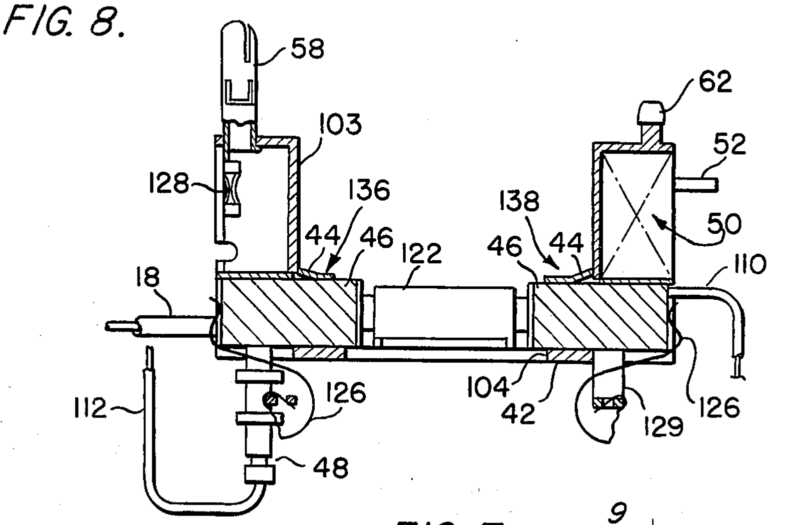
FIG. 8 is a section on the line 8—8 of FIG. 7.

FIG. 8 shows schematically brush springs 126 for resiliently urging the carbon brushes 46 inwards. An earth connection 128 for the banana plug 58 is housed in the compartment 103. Only one of the plug terminals 48 for the brushes is shown extending rearwardly from the printed circuit board 42. The other such terminal 48 has been omitted to show a bracket 129, that would otherwise be hidden, to which the free end of the brush spring 126 is attached. The brush lead 112, which is connected to the brush 46 at one end, has a male connection on the other end which plugs into the terminal 48.

Figure 9:
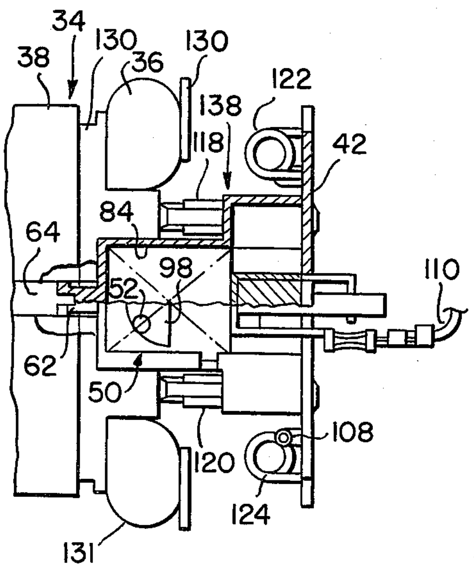
FIG. 9 is a section on the line 9—9 in FIG. 7.

FIG. 9 is a section on the stepped line 9—9 of FIG. 7 and is a representation of the printed circuit board assembly 40 attached to the stator 34 as viewed from underneath the drill and turned around through 180° from the position in FIG. 1. A coil retaining plastic end plate 130, attached to the end face of the stator lamination stack 38, retains the end turns of the field winding 36, and the end turns of a second field winding 131. The two ends of each field winding wire are connected to respective receptacle terminals. These terminals are seated in respective bores of the end plate 130. The field coil plug terminals 114,118 of the printed circuit board assembly engage in receptacle terminals in said bores of the end plate 130 corresponding to one of the fields. Likewise, the field coil plug terminals 116,120 engage in receptacle terminals corresponding to the other field winding. The brush lead 110 is connected to its respective brush via a connector 111.

Figure 10:
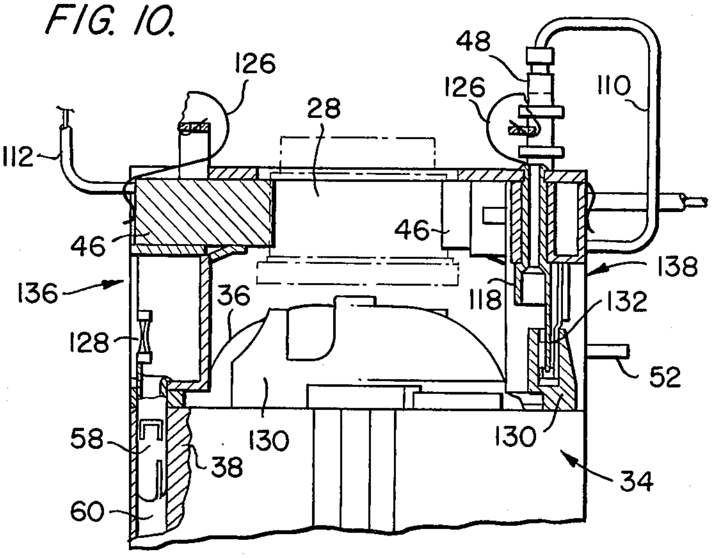
FIG. 10 is a section on the line 10—10 in FIG. 7.

FIG. 10 is a view on the stepped line 10—10 of FIG. 7 and also shows the attachment of the printed circuit board assembly 40 to the stator 34. A plug connection 132 for a lead to the switch 50 is shown.

It will be appreciated from FIGS. 7 through 10, and also FIG. 1, that the printed circuit board assembly 40 is equipped with two housing-like structures, 136, 138, made of plastics material, which support the assembly on the end face of the lamination stator stack, while at the same time, holding it in spaced relation to that end face. Each of the housings 136,138 has mounted thereon two field coil plug terminals and accommodates a brush holder. In addition, the lower housing-like structure 138 includes a compartment wherein the reversing switch 50 is mounted.

Figure 11:
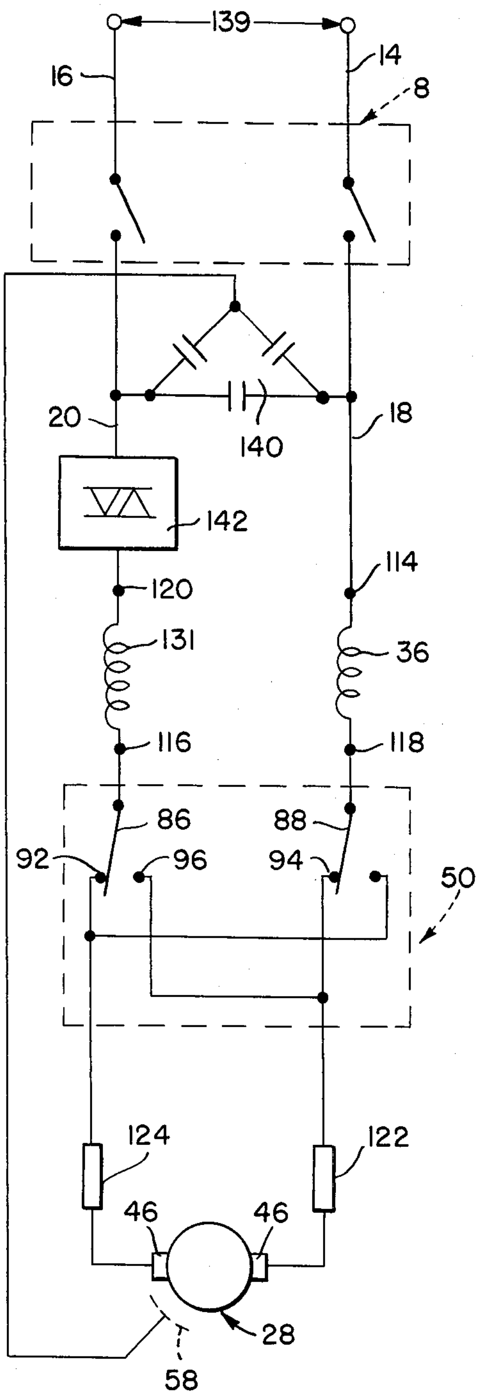
FIG. 11 is a schematic circuit diagram.

FIG. 11 is a schematic circuit diagram showing the connection of the components described and two additional components. Line voltage applied across 139 is carried by leads 14,16 to the main switch 8, thence through leads 18,20 to field coil plug terminals 114,120. Then through field coil windings 36,131 to field coil plug terminals 118,116 and to the reversing switch 50. As shown with the contact arm 88 engaging contact 94 and contact arm 86 engaging contact 92, the brushes 46 are connected in one configuration to rotate the commutator 28 in one direction. When the contact arms 86,88 are pivoted to engage the other pair of contacts, only one of which 96 is shown in FIG. 5, the brushes 46 are connected in a configuration that rotates the commutator 28 in the opposite direction. The noise suppression coils 122,124 are connected between the reversing switch 50 and the brushes 46. A delta capacitor arrangement 140 for noise suppression is connected across leads 18,20 and has an earth ground to the lamination stator stack by the banana plug 58. The delta capacitor arrangement 140 is mounted in the motor housing but not on the printed circuit board assembly. A triak 142 symbolizing the speed-control electronics is mounted in the compartment 24 [see FIG. 1].

Figure 12A:
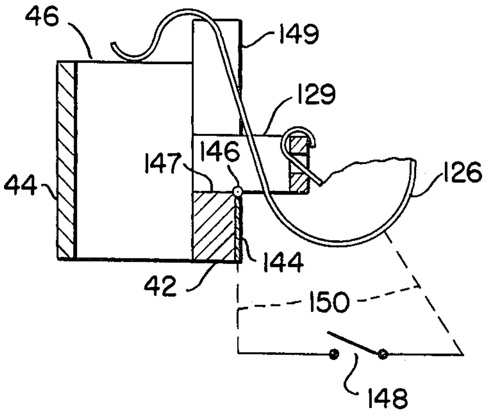
FIGS. 12*a*, *b* and *c* show diagrammatically a section through a brush holder with the brush in different positions.
Figure 12B:
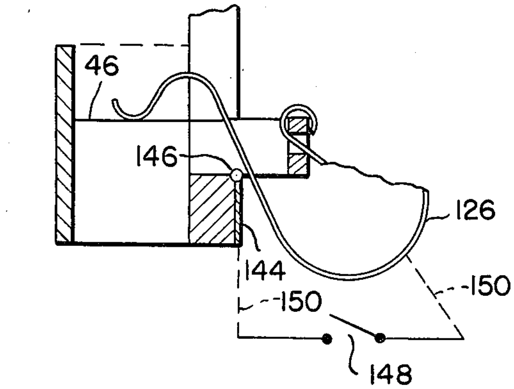
Figure 12C:
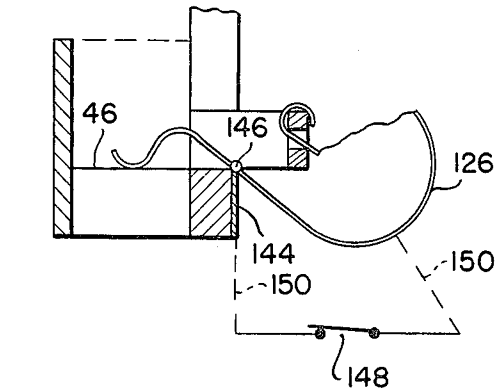

FIGS. 12 *a,b,* and *c* depict schematically an additional feature of the printed circuit board assembly 40 for automatically de-energizing the motor 6 and rendering the portable tool inoperative before worn brushes 46 cause damage to the commutator 28. FIG. 12*a* shows the position of a brush 46 when new in the brush holder 44 with the spring 126, one end of which is connected on the bracket 129, urging the brush 46 downwards. The printed circuit board 42 has a cutout 149 therein to accommodate movement of the spring 126. The cutout 149 has a bottom edge 147. A conductor strip 144 on the printed circuit board terminates in a contact 146 at the edge 147. The conductor strip 144 is connected by circuitry, schematically shown by broken lines 150, to the metal spring 126, this circuitry including a motor cutoff switch 148. As can be seen in FIG. 12*a,* with a new brush 46, the spring 126 is clear of the contact 146. FIG. 12*b* shows the position of the brush 46 when about halfway through its useful life, and again there is still a clearance between the contact 146 and the spring 126. FIG. 12*c* shows the position of the brush 46 when it is worn out and needs replacing before damaging the commutator. As can be seen, in this position of the brush 46, the spring 126 has been arranged to make contact with the contact 146 so energizing the circuitry 150 to effect closing the motor cutoff switch 148 to de-energize the motor 6, so preventing any damage to the commutator.

As can readily be understood, the printed circuit board assembly is a compact module carrying the brush holders with their brushes and springs, the field coil terminal connections, the brush lead connections, noise suppression circuitry components, and the motor reversing switch 50. Moreover, the assembly 40 is readily and simply mounted on the stator lamination stack by inserting the banana-plug 58 and the securing pin 62 in their respective passageways 60,64, at the same time the four field coil plug terminals 114, 116, 118, 120, insert into receptacle terminals [not shown] in the coil retaining end plate 130 as explained above. It should be noted that of the above six mechanical connections of the printed circuit board assembly 40 to the stator assembly 34, only one, namely securing pin 62, does not serve an electrical connection function. The banana plug 58 serves as an earth connection.

It should be further noted that by placing the reversing switch 50 in the assembly 40 inside the motor compartment 2, a second set of wires from the trigger switch 8 is eliminated. Also, the number of electrical connections that have to be made during assembly of the drill is reduced, and with the arrangement of the assembly 40, substantially simplified.

Furthermore, the complete motor module, including the stator assembly 34, the armature 26, and the printed circuit board assembly 40 can be assembled in advance and then placed into a clam-shell housing half of the motor housing 2 whilst on the assembly line.

Figure 13:
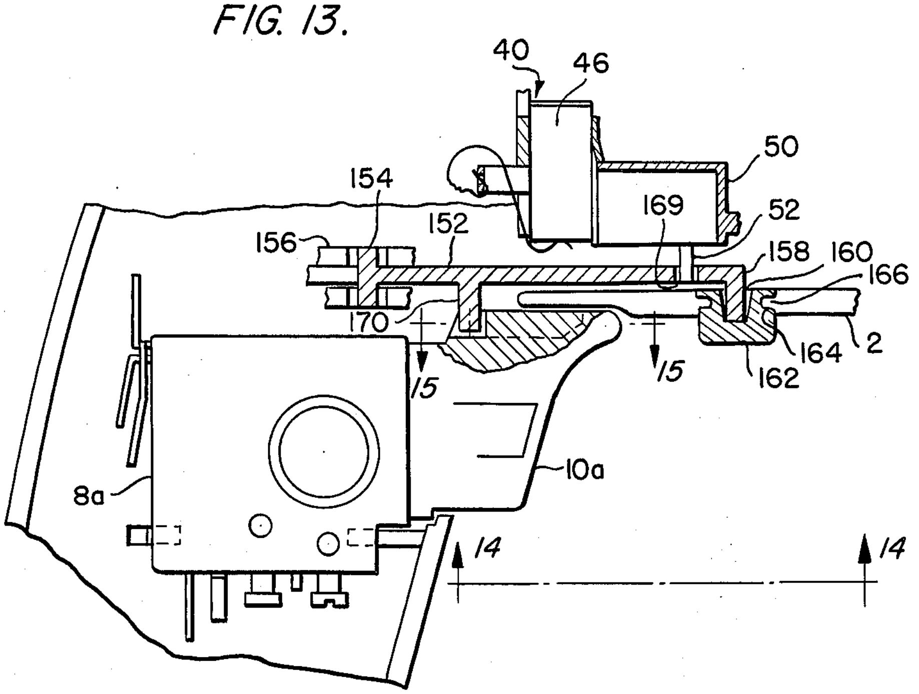
FIG. 13 is a similar section to FIG. 1 showing a modification of the hammer drill.
Figure 14:
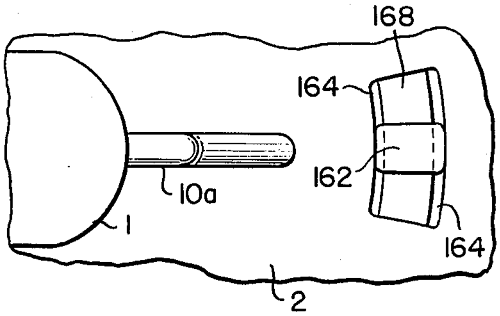
FIG. 14 is a bottom view on the line 14—14 in FIG. 13.
Figure 15:
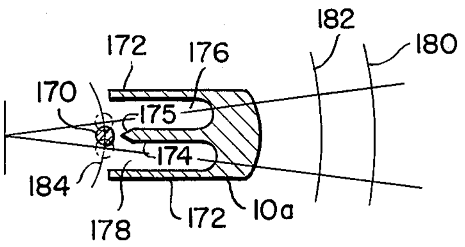
FIG. 15 is a diagrammatic section on the line 15—15 in FIG. 13.

FIGS. 13,14, and 15 show diagrammatically a modification of the mechanism for operating the reversing switch and the interrelation with the main switch. FIG. 13 is a similar view to FIG. 1, but only showing the necessary parts to illustrate the modification. Part of the handle 1, and part of the lower wall of the motor compartment 2 are shown together with the lower portion of the printed circuit board assembly 40 having the brush 46, the reversing switch 50, and its actuating pin 52. The main switch 8*a* and its trigger 10*a* are similar to those shown in FIG. 1. A lever-like member 152, mounted inside the motor housing 2, has a pivot 154 at one end pivotally mounted in a bracket 156 in the motor compartment. At the other end of the member 152 is a downward projection 158 which engages in a cavity 160 of a slide member 162. The slide member 162 has a pair of oppositely opposed grooves 164 therein which slidably engage reduced lips 166 which define the periphery of an arcuate slot 168 [see FIG. 14] through the bottom wall of the motor compartment 2 at a location forward of and adjacent to the trigger 10*a*. Intermediate the length of the lever 152 and adjacent the projection 158 is a hole 169 therethrough which is engaged by the reversing switch pin 52. Near its inner end, the lever 152 has a downwardly projecting pin-like detent 170 which interrelates with the trigger 10*a*.

FIG. 15 shows the upper part of the trigger 10*a* having two thin side walls 172 and a shorter central partition 174 which between them define two grooves 176,178. The central partition 174 has an end edge 175 which engages the pin-like detent 170 when the latter is in a central position [corresponding to the position of the slide member 162 in FIG. 14] to prevent the trigger 10*a* being moved inwardly, and so rendering the main switch 8*a* inoperative. In operation, when the slide member is moved along the arc 180 to either side of the central position, the reversing switch pin 52 is moved along the arc 182 to actuate the reversing switch 50. At the same time, the pin-like detent 170 moves along the arc 184 to one of the positions shown in phantom lines. This then allows the trigger 10*a* to be operated with the pin 170 entering either the groove 176 or the groove 178. As will be appreciated, the detent pin 170 performs the same function as the detent 80 in FIG. 3. It should be noted, in this modification, that the reversing switch pin 52 engages the pivoted lever 152 within the motor compartment 2. Also, the only portion of the means interrelating the reversing switch and the main switch that is accessible from the exterior of the motor compartment 2 is the protruding part of the slide 162 by which the reversing switch is operated.

The above described embodiments, of course, are not to be construed as limiting the breadth of the present invention. Modifications and other alternative constructions will be apparent which are within the spirit and scope of the invention as defined in the appended claims.

For example, the actuating lever 12 in FIG. 1 could be pivotally attached to the underside of the motor housing 2. Also, any convenient type of double pole switch having two actuation positions and a neutral position could be used for the reversing switch 50.

What is claimed is:

1. A portable electric tool, comprising:

an electric motor capable of drivingly rotating in either of two rotational directions;

a housing having a handle and a motor compartment, said motor being contained in said motor compartment;

a printed circuit board in said motor compartment;

a first switch in said handle for energizing said tool;

a second switch comprising a discrete integral component mounted on said printed circuit board in said motor compartment; said second switch determining the rotational direction of drive of said motor; and means, interrelating said first and second switches, for rendering said first switch inoperative until said second switch is positioned to allow said motor to be energized to drivingly rotate in either one or other of said rotational directions.

2. The portable electric tool recited in claim 1, wherein said motor has a stator and an armature, and said printed circuit board has an aperture therein and is mounted on said stator with a portion of said armature disposed through said aperture.

3. The portable electric tool recited in claim 2, wherein said motor has two brushes and said armature has a commutator, said brushes being mounted on said circuit board and said commutator being disposed through said aperture.

4. The portable electric tool recited in claim 3, wherein said second switch controls the direction of feed to said brushes.

5. The portable electric tool recited in claim 1, comprising a plurality of electrical wires feeding from said first switch to said motor compartment for activating the functioning of said tool, the situation of said second switch in said motor compartment enabling said plurality of electrical wires to be at least two less than would otherwise be required.

6. In a portable electric tool having a housing with a reversible motor therein, the motor having an armature provided with a commutator, a printed circuit board assembly having brushes engaging the commutator, and the housing including a depending pistol-grip handle provided with a trigger-operated on/off switch, the improvement which comprises, in combination, a reversing switch mounted on the printed circuit board assembly and disposed within the housing internally of the lower wall thereof, the reversing switch having forward and reverse positions for controlling the direction of rotation of the reversible motor, a manually-manipulatable reversing member mounted adjacent to the trigger and externally of the lower housing wall, interlocking means between the reversing member and the trigger, precluding actuation of the reversing member in the "on" position of the switch, and means extending through the lower housing wall and mechanically coupling the reversing member to the reversing switch on the printed circuit board assembly, whereby the reversing member may be actuated in the "off" position of the switch to move the reversing switch between its forward and reverse positions, respectively.

7. The combination of claim 6, wherein the reversing switch comprises a discrete integral compartment.

8. A portable electric tool comprising:

an electric motor capable of drivingly rotating in either of two rotational directions and having an armature and stator;

a housing having a handle and a motor compartment, said motor being contained in said motor compartment;

a first switch in said handle for energizing said tool and being actuated by a trigger movable in a first direction inwardly and outwardly of said handle;

a printed circuit board situated in said motor compartment and having a central aperture therein and being mounted on said stator with a portion of said armature disposed through said aperture;

a second switch mounted on said printed circuit board for determining the rotational direction of drive of said motor, and having a first actuating member which extends from said second switch for operation thereof, and a second actuating member at least part of which is exterior of said motor compartment, said second actuating member being operatively connected to said first actuating member and being movable transversely to said first direction for determining the rotational direction of said motor;

said trigger and said second actuating member being mechanically interrelated whereby said trigger remains inoperative until said second actuating member is positioned to allow said motor to be energised to drivingly rotate in either one or other of said rotational directions.

9. The portable electric tool recited in claim 8, wherein said second actuating member is pivotally attached to said tool above said trigger and is pivotal about an axis substantially at right angles to said first direction.

10. The portable electric tool recited in claim 8 or 9, wherein said first actuating member is elongated and disposed at right angles to the rotation axis of said motor, and is movable in an arc about an axis at right angles to said rotational axis.

11. The portable electric tool recited in claim 9, wherein said trigger has a partition having an edge facing towards said first switch and defining two grooves in said trigger, and said actuating member has a detent which slidingly engages either of said grooves when said second actuating member is moved transversely to determine the direction of rotation of said motor, said detent engaging said edge to render said trigger inoperative when said second actuating member is in a central position.

12. A portable electric tool as claimed in claim 1, wherein said electric motor and said printed circuit board are incorporated in an electric motor module mounted in the motor compartment as a preassembled unit.

13. A portable electric tool, comprising:

a housing having a motor compartment;

a main switch for energizing the tool;

an electric motor module mounted in the motor compartment and including a printed circuit board assembly which incorporates a reversing switch for determining the rotational direction of drive of the motor module;

means interrelating the reversing switch and the main switch for rendering the main switch inoperative until the reversing switch is positioned to allow the motor module to be energized to drive in either one or other rotational direction;

said reversing switch having an actuating part extending therefrom;

a pivoted member operatively connected to said actuating part and interrelated with the main switch; and means accessible from the exterior of said housing for pivoting the pivoted member to operate the reversing switch.

14. The portable electric tool recited in claim 13, wherein the actuating part is contained within said housing.

15. The portable electric tool recited in claim 14 wherein said housing has a handle, and the main switch is a triggerswitch located in the handle adjacent the motor compartment.

16. The portable electric tool recited in claim 13, wherein:

the electric motor module includes an armature having a commutator, and a laminated stator stack having at least one passageway therein and two field coils; and the printed circuit board assembly includes two brush holders containing brushes engaging the commutator, field coil plug terminals releasably connected to the field coils, and at least one securing pin releasably engaged in said passageway.

17. The portable electric tool recited in claim 13, wherein the electric motor module includes a stator, and the printed circuit board assembly has two housing-like structures which releasably support the assembly on an end of the stator while holding the assembly in spaced relation thereto, the reversing switch being housed in one of the housing-like structures.

18. The portable electric tool recited in claim 17, wherein each said housing-like structure has mounted thereon two plug terminals engaging the stator, and accommodates a brush-holder.

19. A portable electric tool, comprising:

an electric motor capable of drivingly rotating in either of two rotational directions and having an armature with a commutator and a stator;

a housing having a handle and a motor compartment, said motor being contained in said motor compartment;

a first switch in said handle for energizing said tool;

a printed circuit board situated in said motor compartment and having a central aperture therein with a portion of said armature disposed through said aperture;

a pair of brushes mounted on said printed circuit board and being in electrical contact with said commutator; and a second switch mounted on said printed circuit board for determining the rotational direction of drive of said motor, and having a first actuating member which extends from said second switch for operation thereof, said second switch being disposed between said printed circuit board and said stator and having a first pin slidably engaged in said stator for supporting said circuit board;

said first and second switches being mechanically interrelated whereby said first switch remains inoperative until said second switch is positioned to allow said motor to be energized to drivingly rotating in either one or other of said rotational directions.

20. The portable electric tool recited in claim 19, wherein said stator has first and second polarity windings and said printed circuit board supports four terminals connected to said windings.

21. The portable electric tool recited in claim 19 or 20, wherein said printed circuit board has attached thereto a second pin slidably engaged in said stator for supporting said printed circuit board, with second pin being diametrically opposed to said first pin with respect to said stator.

22. The portable electric tool recited in claim 21, wherein said printed circuit has mounted thereon two coils of a noise suppression circuit.

23. A portable electric tool, comprising:

an electric motor having an armature and a stator and being capable of drivingly rotating in either of two rotational directions, said stator having two passageways therein;

a motor compartment containing said motor;

a printed circuit board assembly contained in said motor compartment and comprising a printed circuit board having a central aperture therein, two brushes engaging said armature, four stator field coil terminals electrically and mechanically plugged into said stator, a motor reversing switch, and two securing pins, a portion of said armature being disposed through said aperture, and said securing pins slidably engaging in said passageways to releasably support said assembly on said stator in conjunction with said four field coil terminals; and a main switch for energizing said tool;

said reversing switch and said main switch being interrelated whereby said main switch remains inoperative until said reversing switch is positioned to allow said motor to be energized to rotate in either one or other of said rotational directions.

24. The portable electric tool as recited in claim 23, wherein said tool is a drill.

25. The portable electric tool as recited in claim 23, wherein said tool is a hammer drill.

26. The portable electric tool recited in claim 23, comprising a motor cut-off switch, and wherein said printed circuit board supports two springs for urging said brushes into engagement with the armature, and said printed circuit board has contacts engageable by said springs when the brushes have worn down a predetermined amount to actuate the motor cutoff switch to de-energize the motor.

27. A portable electric tool, comprising:

a housing having a motor compartment;

a main switch for energizing the tool;

an electric motor module mounted in the motor compartment and including a printed circuit board assembly which incorporates a reversing switch for determining the rotational direction of drive of the motor module;

means interrelating the reversing switch and the main switch for rendering the main switch inoperative until the reversing switch is positioned to allow the motor module to be energized to drive in either one or other rotational direction;

the electric motor module including an armature having a commutator, and a laminated stator stack having at least one passageway therein and two field coils; and the printed circuit board assembly including two brush holders containing brushes engaging the commutator, field coil plug terminals releasably connected to the field coils, and at least one securing pin releasably engaged in said passageway.

28. A portable electric tool, comprising:

a housing having a motor compartment;

a main switch for energizing the tool;

an electric motor module mounted in the motor compartment and including a printed circuit board assembly which incorporates a reversing switch for determining the rotational direction of drive of the motor module;

means interrelating the reversing switch and the main switch for rendering the main switch inoperative until the reversing switch is positioned to allow the motor module to be energized to drive in either one or other rotational direction; and sad electric motor module including a stator, and said printed circuit board assembly having two housing-like structures which releasably support the assembly on an end of the stator while holding the assembly in spaced relation thereto, said reversing switch being housed in one of the housing-like structures.

* * * * *